United States Patent [19]

Dolfini et al.

[11] 3,910,902

[45] Oct. 7, 1975

[54] METHOD FOR PREPARING 7-SUBSTITUTED CEPHALOSPORINS BY REPLACEMENT OF OXYGEN CONTAINING GROUPS

[75] Inventors: Joseph Edward Dolfini, Princeton; William A. Slusarchyk, Belle Mead; William Henry Koster, Pennington, all of N.J.

[73] Assignee: E. R. Squibb & Sons, Inc., Princeton, N.J.

[22] Filed: Sept. 6, 1973

[21] Appl. No.: 394,944

Related U.S. Application Data

[63] Continuation-in-part of Ser. No. 312,471, Dec. 6, 1972, abandoned.

[52] U.S. Cl............ 260/243 C; 424/246; 260/239.1

[51] Int. Cl.$^2$................................ C07D 501/02
[58] Field of Search.............................. 260/243 C

[56] References Cited
UNITED STATES PATENTS

| | | | |
|---|---|---|---|
| 3,733,320 | 5/1973 | Pines et al. | 260/243 C |
| 3,775,410 | 11/1973 | Christensen et al. | 260/243 C |
| 3,780,037 | 12/1973 | Hazen | 260/243 C |

*Primary Examiner*—Nicholas S. Rizzo
*Attorney, Agent, or Firm*—Lawrence S. Levinson; Merle J. Smith; Stephen B. Davis

[57] ABSTRACT

Disclosed is a method for replacing 7-lower alkanoyloxy and 7-aroyloxy groups from cephalosporins with other lower alkanoyloxy, lower alkoxy, aryloxy, amino, lower alkyl amino and azido moieties.

8 Claims, No Drawings

METHOD FOR PREPARING 7-SUBSTITUTED CEPHALOSPORINS BY REPLACEMENT OF OXYGEN CONTAINING GROUPS

This application is a continuation-in-part of our co-pending application, Ser. No. 312,471, filed Dec. 6, 1972, now abandoned.

Cephalosporins are of considerable interest to the pharmaceutical industry. Presently compounds of this type are being employed as potent antimicrobials. As in the case of the penicillins and tetracyclines, researchers are now trying to improve on the activity of these antibiotics by modifying the naturally occurring cephalosporins. Unfortunately, most antibiotics are quite complex and therefore simple reactions cannot be utilized to introduce the desired modifications. Usually considerable effort must be extended to devise a method for modifying such complex entities. Herein is described such a procedure which gives rise to useful antibacterial cephalosporins.

This invention relates to a method for the conversion of cephalosporins of the formula:

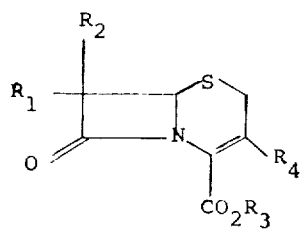

into compounds of the formula:

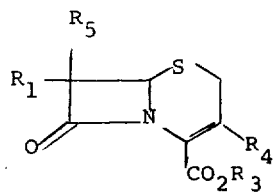

wherein $R_1$ is phthalimido acylamino, a Schiff base such as benzalimino, or a substituted Schiff base; $R_2$ is lower alkanoyloxy or aroyloxy or substituted aroyloxy; $R_3$ is hydrogen, a cation such as $Na^+$, $Li^+$, $Ca^{++}$, $k^+$, $NH_4^+$ and $(C_2H_5)_3NH^+$ or a readily clevable ester such as t-butyl, trichloroethyl, trimethylsilyl or p-methoxybenzyl; $R_4$ is methyl, acetoxymethyl or carbamoyloxymethyl; and $R_5$ is lower alkoxy, other lower alkanoyloxy, aryloxy, azido, amino, mono-and di-lower alkyl amino, by the use of certain mercury, silver and thallium salts and an appropriate source of $R_5$, such as a lower alkyl alcohol, a phenol or its salt, amines, lower alkyl amines, di-lower alkyl amines, lower alkanoic acid or salt thereof, or metal azides Acyl is defined in this invention as:

(a)

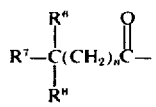

wherein $R^6$, $R^7$ and $R^8$ are hydrogen, lower alkyl, cycloalkyl, cycloalkenyl, cycloalkadienyl, lower alkoxy lower alkyl, thienyl, substituted thienyl, phenyl, substituted phenyl, phenoxy, substituted phenoxy, amino, nitro, halo, mercapto, lower alkylmercapto, lower alkylmercapto lower alkyl, phenylthio and substituted phenylthio wherein the substituents on the thienyl, phenyl, phenoxy, and phenylthio may be one or more of the following: lower alkyl, lower alkoxy, halo, nitro, amino and trifluoromethyl and n is either O or an integer from 1 to 4.

b. $R^9CO$— wherein $R^9$ is hydrogen, amino, phenyl, substituted phenyl, lower alkoxy, thienyl, substituted thienyl, phenoxy, lower alkylthio, substituted phenoxy, β-lower alkenyl, β-lower alkylthio, lower alkenyl, β-lower alkoxy lower alkenyl and β-lower alkenyloxy lower alkyl, wherein the substituents on the thienyl, phenyl and phenoxy may be one or more of the following: lower alkyl, lower alkoxy, halo, nitro, amino and trifluoromethyl.

Lower alkyl is defined as a branched or straight chain having from one to six carbon atoms. This definition also applies to terms incorporating lower alkyl with other groups, such as aryl lower alkyl which is intended to mean an aryl group linked to an alkyl group having one to six carbon atoms.

Aryl is defined as phenyl and α and β-naphthyl.

"Substsituted" as in substituted Schiff base, substituted aryl or substituted benzalimino is intended to mean unless specifically defined otherwise as mono- or disubstituted wherein said substituents may be lower alkyl, lower alkoxy, nitro, chloro, fluoro or trifluoromethyl.

Numerous modifications of the naturally occurring cephalosporins have already been made in an effort to enhance antimicrobial activity with a certain degree of success being achieved. One of the positions of the cephalosporin nucleus which a number of researchers have focused upon as a place for introducing new groupings is the 7-position. Since substituents on the 7α-position tend to demonstrate higher degrees of antimicrobial activity than 7β-substituents, attempts to devise new syntheses for introducing substituents into this position are generally directed to the introduction of 7α-substituents.

This invention teaches how one may convert the readily prepared 7-acyloxy derivatives to compounds wherein the 7-acyloxy group is replaced by lower alkoxy, aryloxy, other lower alkanoyloxy, axido, amino and lower alkylamino groups.

The above described starting materials of the structure

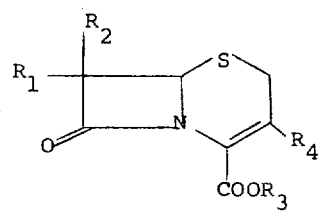

wherein $R_1$ through $R_4$ are as previously defined are converted into the compounds of this invention having the formula:

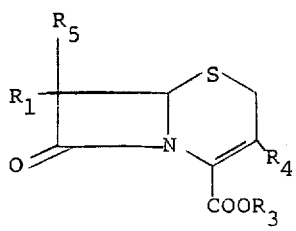

wherein $R_1$ to $R_5$ are as previously described, by the use of a reagent to supply the grouping which shall ultimately be $R_5$ in the presence of a mercury, silver or thallium salt catalyst. The cations to be used as catalysts are preferably in their highest oxidation sate ("ic" form) and the anions are preferably one of the following: lower alkoxy, lower alkanoyloxy, cyano, nitrate, fluoro, bromo, chloro and sulfate.

For $R_5$ to be lower alkoxy, the reagent may be the corresponding lower alkanol. In turn, lower alkanoyloxy is introduced by utilizing the corresponding lower alkanoic acid or a heavy metal salt thereof, (mercury, silver, etc.); aryloxy is introduced byutilizing a substituted phenol or salt thereof, azido is introduced by the use of an azide salt, such as potassium or sodium azide in the presence of catalyst; amino is introduced by the use of an excess of amine in the presence of catalyst.

The reactions of this invention are preferably conducted in inert solvents, such as dimethoxyethane, dioxane, dimethylformamide and tetramethylurea at temperatures from about −10° to about 110°C, preferably from about 0° to about 70°C. However, where a lower alkoxy group is being introduced, the correspnding alcohol may be employed as the reaction solvent. The replacement reactions of this invention take place at a relatively rapid rate so that the reaction time required is usually from about a few minutes to several hours at ambient temperature.

While this reaction is of a general nature, the preferred compounds to be prepared by the process of this invention are those of the formula:

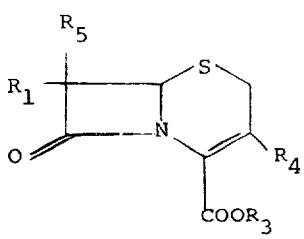

wherein $R_1$ is benzalimino, p-nitrobenzalimino, p-methoxybenzalimino, thienylacetamido, α-aminophenylacetamido, α-amino-1,4-cyclohexadienylacetamido, phenylacetamido or phenoxyacetamido, $R_4$ is methyl or acetoxymethyl, carbamoyloxymethyl and $R_5$ is lower alkoxy and lower alkanoyloxy, aryloxy and azido.

In addition, it has been found that if one employs a 7α-alkanoyloxy or 7α-aroyloxy-7-benzaliminocephalosporin, one obtains almost exclusively 7α$R_5$-substitution, whereas if a 7α-alkanoyloxy or 7α-aroyloxy-7-acylamino cephalosorin is employed, the relative amounts of isomers obtained are determined by the nature of the solvent or the catalyst used.

This invention is intended to encompass the preparation of both 7α and 7β isomers, in addition to those which may also be encountered at other sites in compounds of this invention.

The cephalosporins which may be prepared by this invention are useful against gram-positive bacteria, such as *Staphylococcus aureus* and *Streptococcus pyrogenes*, and especially against gram-negative bacteria such as *Escherichia coli* and *Proteus vulgaris*.

EXAMPLE 1

7α-Methylthio-7-benzaliminodesacetoxycephalosporanic Acid t-Butyl Ester (from Methylthiolation of Schiff Base)

Method A. Methyl Methanethiosulfonate Procedure

To a stirred solution of 7-benzaliminodesacetoxy cephalosporanic acid t-butyl ester (13.5 g, 37.7 mmol) in 200 ml dimethoxyethane at −20° under $N_2$, potassium t-butoxide (4.22 g, 37.7 mmol) is added. A deep red solution is formed which is stirred for 1.5 minutes and methyl methanethiolsulfonate (4.75 g, 37.7 mmol) is added. When the color of the solution turns from deep red to yellow, the reaction mixture is poured into pH 6.5 buffer (300 ml). The mixture is extracted with $CHCl_3$, and the $CHCl_3$ extract is washed with saturated NaCl solution, dried ($Na_2SO_4$), and evaporated to a residue. Recrystallization of the residue from acetone-hexane gives 5.38 g (35% yield) 7α-methylthio Schiff base, ir ($CHCl_3$) 1764 (β-lactam C=O), 1715 (conjugated ester C=O), 1628 (C=N), and 1130 cm$^{-1}$ (S—$CH_3$); pmr ($DCCl_3$) τ8.45 (9 H,s,t-butyl), 7.93 (3H,s,C=C—$CH_3$), 7.70 (C-6), 2.0–2.8 (5H,m,aromatics), 1.91 (1H,s,CH=N); mass spectrum, molecular ion at 404.1206 (calcd. for $C_{20}H_{24}N_2O_3S_2$:404.1226). An analytical sample that is recrystallized from $CH_2Cl_2$-pet ether melts at about 165°.

Method B. Methysulfenyl Chloride Procedure

The procedure in part A is followed using methylsulfenyl chloride in place of methylmethanethiolsulfonate. From (20.3 g, 56.5 mmol) Schiff base, (6.33 g, 56.5 mmol) potassium t-butoxide, (4.6 g, 56.5 mmol) methylsulfenyl chloride, and 250 ml dimethoxyethane is obtained 7.70 g (34% yield) crystalline Schiff base.

EXAMPLE 2

7α-Methylthio-7-benzaliminocephalosporanic Acid t-Butyl Ester

By following the procedure in Example 1, but substituting 7-benzaliminocephalosporanic acid t-butyl ester for the Schiff base substrate, the desired product is obtained as a crystalline product having m.p. 124°–125°C.

EXAMPLE 3

7α-Phenylthio-7-(p-nitrobenzalimino)cephalosporanic Acid p-Methoxybenzyl Ester

By following the procedure in Example 1, method B, but substituting 7(p-nitrobenzalimino)cephalosporanic acid p-methoxybenzyl ester for the Schiff base substrate and phenylsulfenyl chloride for methylsulfenyl chloride, the desired product is obtained as an amorphous product.

EXAMPLE 4

7α-Ethylthio-7-(p-methoxybenzalimino)desacetoxycephalosporanic Acid t-Butyl Ester By following the procedure in Example 1, method B, but substituting 7-(p- methoxybenzalimino)desacetoxycephalosporanic acid t-butyl ester for the Schiff base substrate and ethylsulfenyl chloride for methylsulfenyl chloride, the desired product is obtained as an amorphous material.

EXAMPLE 5

7α-Methylthio-7-phenylacetamidodesacetoxycephalosporanic Acid t-Butyl Ester

To a stirred solution of 7α-methylthio Schiff base from Example 1 (2.54 g, 6.28 mmol) in 30 ml of $CH_2Cl_2$ at room temperature under $N_2$, phenylacetyl chloride (0.84 ml. 6.28 mmol) and water (0.15 ml, 8.34 mmol) are added. The mixture is stirred for 18 hours, diluted with $CH_2Cl_2$, and poured into water. The pH is adjusted to 7.5, and the $CH_2Cl_2$ layer is washed successively with water, dilute aqueous $NaHSO_3$, and water. The $CH_2Cl_2$ solution is dried ($Na_2SO_4$) and evaporated in vacuo to a residue that crystallized from $Et_2O$—$CH_2Cl_2$ to give 1.18 g (43% yield) of the above named product: ir ($CHCl_3$) 1775 (β-lactam C=O), 1712 (conjugated C=O), 1675 (amide C=O), 1480 ("amide II" band), and 1130 cm$^{-1}$ (S—$CH_3$); pmr ($DCCl_3$) τ8.50 (9H,s,t-butyl), 7.92 (3H,s,C=C—$CH_3$), 7.75 (3H,—$SCH_3$), 6.82 (2H,broad singlet, C-2),

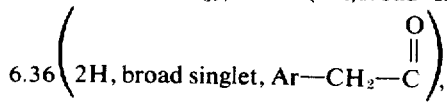

5.09 (1H,s,N—H). An analytical sample is recrystallized from $Et_2O$—$CHCl_3$ (mp 174°–175°).

EXAMPLE 6

7α-Methylthio-7-phenylacetamidocephalosporanic Acid t-Butyl Ester

By following the procedure in EXample 5, but substituting 7α-methylthio-7-benzaliminocephalosporanic acid t-butyl ester for the Schiff base substrate, the desired product is obtained as an amorphous solid: pmr ($DCCl_3$) τ7.92 (3H,s,O-acetyl), 7.77 (3H,s,S—$Ch_3$), 6.60 (2H,broad singlet,C-2), 6.24 (2H,s,Ar—$CH_2$), and 5.07 (1H,s,C-6).

EXAMPLE 7

7α-Acetoxy-7-phenylacetamidodesacetoxycephalosporanic Acid t-Butyl Ester a. To a suspension of the 7α-methylthio amide (Example 5) (651 mg, 1.5 mmol) in a 5 ml of dimethoxyethane is added mercuric acetate (478.5 mg, 1.5 mmol). The mixture is stirred under nitrogen for 20 minutes at room temperature. The precipitate is filtered and washed with dimethoxyethane yielding 413 mg pale yellow powder. The filtrate is evaporated to a residue that is taken up in benzene-water. The benzene layer is washed with water, dried ($Na_2SO_4$) and evaporated to give 620 mg (93% yield) of the above named 7α-acetoxy t-butyl ester as an almost colorless oil: ir ($CHCl_3$) 1785 (β-lactam C=O), 1750(sh) (ester C=O), 1720-1685 (broad band, conjugated C=O and amido C=O), and 1480cm$^{-1}$ (amide IIband); pmr ($DCCl_3$) τ8.48 (9H,s,t-butyl), 7.90

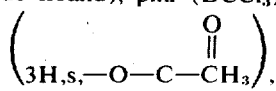

6.98 (2H,s,C—2), 6.32 (2H,s,—$CH_2$—$\overset{O}{\underset{\|}{C}}$—), 4.87 (1H,s,C-6), 2.85 (1H,s,N—H), 2.67 (5H,s,aromatics); mass spectrum, no molecular ion but m/e 344 (M—$CH_3COOH$).

b. To 109 mg (0.25 mmole) of methylthio amide (Example 5) in 2 ml of acetic acid is added 164 mg (2 mmoles) of sodium acetate followed by 80 mg (0.25 mmole) of mercuric acetate. The mixture is stirred for 15 minutes at room temperature, and the acetic acid is removed in vacuo. The residue is taken up in benzene and water. The benzene layer is washed with aqueous sodium chloride solution, dried ($Na_2SO_4$), and evaporated to give 112 mg of 7α-acetoxy-7-phenylacetamidodesacetoxycephalosporanic acid t-butyl ester as a residue.

EXAMPLE 8

7α-Acetoxy- and β-acetoxy-phenylacetamidodesacetoxycephalosporanic Acid t-Butyl Esters A mixture of 63 mg (0.14 mmole) of 7α-acetoxy compound from Example 7 and 45 mg (0.14 of mercuric acetic in 0.5 ml of dimethylformamide is stirred under nitrogen at room temperature for 25 minutes. The mixture is taken up in water and benzene, and the benzene layer is washed twice with water, dried ($Na_2$-$SO_4$), and evaporated in vacuo to give 58 mg of yellow residue consisting of approximately equal quantities of 7α-acetoxy-7-phenylacetamidodesacetoxycephalosporanic acid t-butyl ester and 7β-acetoxy-7-phenylacetamidodesacetoxycephalosporanic acid t-butyl ester: pmr ($DCCl_3$) 7α-acetoxy epimer,

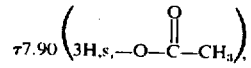

6.98 (2H,broad singlet, C-2), 6.32

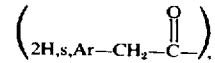

4.87 (1H,s,C-7); 7β-acetoxy epimer, τ7.87

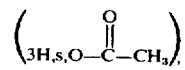

6.77 (2H,broad singlet, C-2), 6.37

4.82 (1H,s,C-7).

EXAMPLE 9

7-Benzalimino-7α-acetoxydesacetoxycephalosporanic Acid t-Butyl Ester

A mixture of mercuric acetate (431 1 mg, 0.135 mmol) and the methylthio Schiff base from Example 1 (500 mg, 0.124 mmol in dimethoxyethane (20 ml is stirred at room temperature for 30 minutes. Dilution with anhydrous ether (100 ml) and filtration through Celite removes insoluble material. After stripping solvent under reduced pressure, the residue is taken up in ether and washed with 5% bicarbonate solution and water. The organic layer is treated with Norite, and the volume of solvent is reduced, yielding the above named product as an amorphous solid.

EXAMPLE 10

7α-Azido and 7β-azido-7-phenylacetamidodesacetoxycephalosporanic Acid t-Butyl Esters To 63 mg (0.14 mmole) of 7α-acetoxy compound (Example 7) in 0.4 ml of dimethylformamide is added 92 mg (1.4 mmole) of sodium azide followed by 45 mg (0.14 mmole) of mercuric acetate. The mixture is stirred under nitrogen for 30 minutes at room temperature. The solvent is removed under reduced pressure, and the residue is taken up in benzene and water. The benzene layer is washed three times with water, dried ($Na_2SO_4$) and evaporated yielding 60 mg of residue consisting of 7α-azido- and 7β-azido-7-phenylacetamidodesacetoxycephalosporanic acid t-butyl esters: ir ($CHCl_3$) 2070 and $2130cm^{-1}$ azide; 1780 (β-lactam C=O), 1715 (ester C=O), $1670cm^{-1}$ (amide C=O).

EXAMPLE 11

Methanol Solvolysis of 7α-Acetoxy- and 7β-acetoxy-7-phenylacetamidodesacetoxycephalosporanic Acid t-Butyl Esters To a solution of 465 mg (1.04 mmole) of an approximately 50:50 mixture of 7α-acetoxy and 7β-acetoxy epimers in 3 ml of methanol is added 332 mg (1.04 mmole) mercuric acetate. The mixture is stirred under nitrogen at room temperature for 40 minutes. The methanol is removed under reduced pressure, and the residue is taken up in benzene and water. The benzene layer is washed with water, dried ($Na_2SO_4$) and evaporated to give 430 mg of residue consisting of 7α-methoxy- and 7β-methoxy-7-phenylacetamidodesacetoxycephalosporanic acid esters. The residue is subjected to slow fractional crystallization from small amounts of $CH_3OH$, which yields 400 mg pale yellow crystalline α-methoxy epimer a residue from crystal washings, and 120 mg mother liquor whose pmr spectrum indicates a 40:60 mixture of a α-methoxy and β-methoxy epimers, respectively. Slow crystallization of this mixture of epimers gives additional crystalline α-methoxy epimer and 60 mg of mother liquor whose pmr spectrum indicates a mixture of 70% β-methoxy epimer and 30% o-methoxy epimer.

The crystalline α-methoxy epimer, on recrystallization from $CH_3Oh$ has: mp 175°–176°; ir spectrum ($CHCl_3$) 1770 (β-lactam C=O), 1710 (conjugated C=O), 1690 (amide C=O), 1158, 1134, 1106, and 1086 $cm^{-1}$ (C—O—C and C—S—C); pmr ($DCCl_3$, 60 MHz), τ8.50 ( 9H,s,t-butyl), 7.90 (3H,s,C=C—$CH_3$), 6.55 (3H,s,O$CH_3$), 6.75, 6.95 ( 2H,q,J=17Hz, C-2), 6.33

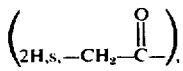

4.98 (1H,s,C-6), 3.32 (1H,b,N—H), 2.67 (5H,s,aromatics); mass spectrum molecular ion at m/e 418. 1584 (calcd. for $C_{21}H_{26}N_2O_5S$: 418.1560).

The mother liquor containing 70% β-methoxy epimer shows: ir ($CHCl_3$) 1770 (β-lactam C=O), 1710 (conjugated C=O), 1690 (amide C=O), and 1155, 1138, 1100 and $1090cm^{-1}$; pmr ($DCCl_3$) τ8.50 (9H,s,t-butyl), 7.93 (3H,s,C=C-$CH_3$), 6.68 and 6.88 (2H,q,J=17Hz,C-2), 6.58 (3H,s,—O$CH_3$), 6.37

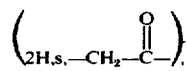

4.83 (1H,s,C-6), 2.67 (5H,s,aromatics).

EXAMPLE 12

7-Benzalimino-7α-methoxydesacetoxycephalosporanic Acid t-Butyl Ester

A mixture of mercuric acetate (1 mmol) and the 7-acetoxy Schiff base (1 mmol) from Example 9 in methanol is stirred for 30 minutes at room temperture. The mixture is evaporated to a residue which is taken up in benzene and water. The benzene layer is washed with water, dried ($Na_2SO_4$), and evaporated to a residue. Crystallization of the residue from methanol gives the desired product having mp 141°–142°; ir ($CHCl_3$) 1770 (β-lactam C=O), 1715 (t-butyl ester C=O), $1635cm^{-1}$ (C=N); pmr ($DCCl_3$) τ8.47 (9H,s,t-butyl $CH_3$), 7.78 (3H,s,$CH_3$), 6.98 (1H,d,$J_{gem}$=17Hz,C-2), 6.55 (1H,d,$J_{gem}$=17Hz,C-2), 6.39 (3H,s,O$CH_3$), 4.92 (1H,s,C-6), 1.97–2.75 (5H,complex m, aromatic), 1.30 (1H,s,azomethine CH).

EXAMPLE 13

7-Benzalimino-7α-ethoxydesacetoxycephalosporanic Acid t-Butyl Ester

The procedure described in Example 12 is used to prepare the above named compound. The acetoxy Schiff base from Example 9 is solvolyzed in abolsute ethanol and catalyzed by the addition of b 1 equivalent of mercuric acetate. After the workup, the 7α-ethoxy Schiff base is obtained; pmr ($DCCl_3$) τ8.70 (3H,t,O$CH_2CH_3$), 8.42 (9H,s,t-butyl $CH_3$), 7.93 (3H,s,$CH_3$), 6.73 (2H,dd,C-2), 6.10 (2H,q,O$CH_2CH_3$), 4.92 (1H,s,C-6), 1.95–2.67 (5H,complex m, aromatic; $M^+$, m/e 402 ($C_{21}H_{26}N_2O_4S$ = 402).

EXAMPLE 14

Sodium Salts of 7α-Methoxy-7-propionamidodesacetoxycephalosporanic Acid and 7β-Methoxy-7-propionamidodesacetoxycephalosporanic Acid The procedure described in Example 11 is used to solvolyze the sodium salt of 7α-acetoxy-7-propionamidodesacetoxycephalosporanic acid. However, the workup is modified such that the residue from the reaction mixture is taken up in water and, after adjusting the acidity of the aqueous solution to pH 3.5, the aqueous solution is exhaustively extracted with methylene chloride. The combined extracts are dried ($Na_2SO_4$) and solvent is removed under reduced pressure. The residue is suspended in methanol and one equivalent of sodium methoxide is added while stirring vigorously. Removal of solvent in vacuo yields a mixture of the desired sodium salts as an amorphous solid.

General Procedures for the metal catalyzed solvolysis of the 7-alkanoyloxy or 7-aroyloxy cephems (1) shown in Table 1.

To a solution or suspension of the 7-alkanoyloxy or 7-aroyloxy cephem in the indicated anhydrous solvent system, is added 1.0 equivalent of metal catalyst and 4–10 equivalents of organic salt, if indicated in table. The heterogeneous mixture is stirred, preferably under an inert atmosphere, at the temperature shown in Table I. The reaction is best followed to completion by monitoring the mixture on thin layer chromatography since reaction times are found to vary. After removal of the solvent system in vacuo, the residue is diluted with an organic solvent, which is immiscible with water, and filtered to remove insoluble materials. The solution is washed with dilute aqueous sodium bicarbonate solution and water, the organic layer is dried, and solvent is removed under reduced pressure. An amorphous residue is obtained containing the appropriate cephem derivative indicated in Table I.

TABLE I

| $R_1$ | $R_2$ | $R_3$ | $R_4$ | $R_5$ | Catalyst | Solvent | Temp. |
|---|---|---|---|---|---|---|---|
| Ph–$CH_2$–CONH | –OAc($\alpha$) | t-butyl | $CH_3$ | OAc($\alpha+\beta$) | $Hg(OAc)_2$ | DMF | 25° |
| Thienyl–$CH_2$–CONH | –OAc($\alpha$) | $CH_3O$–Ph–$CH_2$ | $CH_2OAc$ | OAc($\alpha+\beta$) | $Hg(OAc)_2$ | AcOH | 25° |
| Ph–$CH_2$–CONH | –OAc($\alpha$) | t-butyl | $CH_3$ | $OCH_3(\alpha)$ | $Hg(OAc)_2$ | $CH_3OH$ | 25° |
| Ph–$CH_2$–CONH | –OAc($\alpha$) | t-butyl | $CH_3$ | $OCH_3(\alpha+\beta)$ | $Hg(OAc)_2$ | $CH_3OH$–DMF | 25° |
| Ph–S–$CH_2$–CONH | –OAc($\alpha+\beta$) | t-butyl | $CH_3$ | $OCH_3(\alpha+\beta)$ | $Hg(OAc)_2$ | $CH_3OH$ | 25° |
| Ph–CH(NH$_2$)–CONH | OAc($\alpha+\beta$) | $CH_3O$–Ph–$CH_2$ | $CH_2OAc$ | $OCH_3(\alpha+\beta)$ | $Hg(OAc)_2$ | $CH_3OH$ | 25° |
| $CH_3$–$CH_2$–CONH | $C_6H_5COO$ ($\alpha$) | $CH_2$–$CCl_3$ | $CH_3$ | $OCH_3(\alpha+\beta)$ | $Hg(OAc)_2$ | $CH_3OH$–DMF | 25° |
| Ph–O–$CH_2$–CONH | OAc($\alpha+\beta$) | $CH_3$ | $CH_2OAc$ | $OCH_2CH_3$ ($\alpha+\beta$) | $Hg(OCH_3)_2$ | $CH_3CH_2OH$ | 25–80° |
| Ph–$OCH_2$CONH | OAc($\alpha+\beta$) | t-butyl | $CH_3$ | $OCH_2CH_3$ ($\alpha+\beta$) | $Hg(OAc)_2$ | $CH_3CH_2OH$ | 25° |
| (2,6-diOCH$_3$)Ph–CONH | OAc($\alpha+\beta$) | t-butyl | $CH_3$ | $OCH_3(\alpha+\beta)$ | $Hg(OCH_3)_2$ | $CH_3OH$ | 25° |
| Ph–S–$CH_2$–CONH | OAc($\alpha$) | t-butyl | $CH_3$ | $OOCCH_2CH_3$ ($\alpha+\beta$) | $Hg(OAc)_2$ | (10 equiv) of $CH_3CH_2$–COONa, DMF | 25–80° |
| Phthalimido–N– | OAc($\alpha+\beta$) | $CH_3O$–Ph–$CH_2$–$CH_3$ |  | $OCH_3(\alpha+\beta)$ | $Hg(OAc)_2$ | $CH_3OH$ | 25° |
| Phthalimido–N– | OAc($\alpha+\beta$) | $CH_3O$–Ph–$CH_2$– | $CH_3$ | $OCH_3(\alpha+\beta)$ | $Hg(OCH_3)_2$ | $CH_3OH$ | 25° |
| Phthalimido–N– | OAc($\alpha+\beta$) | $CH_3O$–Ph–$CH_2$– | $CH_3$ | $OCH_3(\alpha+\beta)$ | $Pb(OAc)_4$ | $CH_3OH$ | 25° |

TABLE I – Continued

| R₁ | R₂ | R₃ | R₄ | R₅ | Catalyst | Solvent | Temp |
|---|---|---|---|---|---|---|---|
| phthalimido-N- | OAc(α+β) | CH₃O-C₆H₄-CH₂- | CH₃ | OCH₃(α+β) | AgOAc | CH₃OH | 25° |
| phthalimido-N- | OAc(α+β) | CH₃O-C₆H₄-CH₂- | CH₃ | OCH₃(α+β) | AgBF₄ | CH₃OH | 25° |
| phthalimido-N- | OAc(α+β) | CH₃O-C₆H₄-CH₂- | CH₃ | OCH₃(α+β) | Tl(OAc)₃ | CH₃OH | 25° |
| phthalimido-N- | OAc(α+β) | CH₃O-C₆H₄-CH₂- | CH₃ | piperidino (α+β) | HgCl₂ | piperidine/DME | 25° |
| phthalimido-N- | OAc(α+β) | CH₃O-C₆H₄-CH₂- | CH₃ | NH₂ (α+β) | HgCl₂ | DME/NH₃ | 25° |
| phthalimido-N- | OAc(α+β) | CH₃O-C₆H₄-CH₂- | CH₃ | N(CH₃)₂ (α+β) | HgCl₂ | DME/(CH₃)₂NH | 25° |
| C₆H₅-CH(NH₂)-CONH | OAc(α+β) | t-butyl | CH₃ | C₆H₅O- (α+β) | Hg(OCH₃)₂ | C₆H₅ONa in DMF | 25–80° |
| furyl-CH₂-CONH | OAc(α+β) | CH₂-CCl₃ | CH₂OAc | OOCCH₂CH₃ (α+β) | Hg(OCH₃)₂ | CH₃CH₂COONa in DMF | 25–80° |
| C₆H₅-CH₂-CONH | OAc(α) | t-butyl | CH₃ | -N₃(α+β) | Hg(OAc)₂ | NaN₃, DMF | 25° |
| thienyl-CH₂-CONH | OAc(α) | CH₃O-C₆H₄-CH₂ | CH₂OAc | -N₃(α+β) | Hg(OAc)₂ | NaN₃, DMF | 25° |
| C₆H₅-CH₂-CONH | OAc(α) | t-butyl | CH₃ | (CH₃)₂N- (α+β) | Hg(OAc)₂ | (CH₃)₂NH, DMF | 25° |
| cyclohexyl-CONH | OAc(α) | t-butyl | CH₃ | -N₃ (α+β) | Hg(OCH₃)₂ | NaN₃, DMF | 25° |
| O₂N-C₆H₄-CH=N- | OAc(α) | t-butyl | CH₃ | OCH₃(α) | Hg(OAc)₂ | CH₃OH | 25° |
| C₆H₅-CH=N- | OAc(α) | CH₃O-C₆H₄-CH₂ | CH₂OAc | OCH₃(α) | Hg(OCH₃)₂ | CH₃OH | 25° |
| piperidino-CH=N- | OAc(α) | t-butyl | CH₃ | OCH₂CH₃(α) | Hg(OAc)₂ | CH₃CH₂OH | 25–80° |

TABLE I — Continued

| R₁ | R₂ | R₃ | R₄ | R₅ | Catalyst | Solvent | Temp. |
|---|---|---|---|---|---|---|---|
| 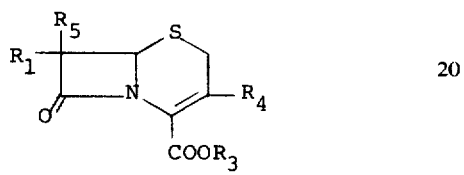 | OAc(α) | t-butyl | —CH₂OAc | —N₃(α+β) | Hg(OAc)₂ | NaN₃, DMF | 25° |
| 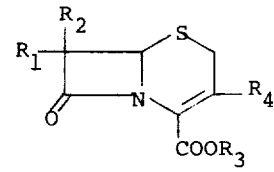 | OAc(α) | t-butyl | CH₃ | (CH₃)₂N— (α+β) | Hg(OAc)₂ | (CH₃)₂NH, DMF | 25° |

What is claimed is:

1. A process for the preparation of compounds of the formula:

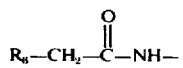

wherein $R_1$ is selected from the group consisting of phthalimido, benzalimino, substituted benzalimino,

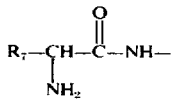

wherein $R_6$ is selected from the group consisting of phenyl, substituted phenyl, 1,4-cyclohexadienyl, phenoxy, substituted phenoxy thienyl, furyl, phenylthio and substituted phenylthio,

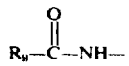

wherein $R_7$ is selected from the group consisting of phenyl, substituted phenyl, and 1,4-cyclohexadienyl, and $$R_9-\overset{O}{\underset{\|}{C}}-NH-$$

wherein $R_9$ is selected from the group consisting of lower alkyl, phenyl and substituted phenyl, and wherein said benzalimino, phenyl, phenoxy, or phenylthio substituent is one or two members selected from the group consisting of lower alkyl, lower alkoxy, nitro, chloro, fluoro and trifluoromethyl; $R_3$ is selected from the group consisting of hydrogen, t-butyl, trichloroethyl, trimethylsilyl, p-methoxybenzyl, and a cation; $R_4$ is selected from the group consisting of methyl, acetoxymethyl, and carbamoyloxymethyl; and $R_5$ is selected from the group consisting of lower alkoxy, phenoxy, lower alkanoyloxy, amino, lower alkylamino, lower dialkylamino, and azido; which comprises reacting a compound of the formula $$\begin{array}{c} R_2 \\ R_1 \end{array} \begin{array}{c} S \\ \end{array} \begin{array}{c} \\ \end{array} \begin{array}{c} \\ \end{array} R_4$$
$$\overset{}{O} \quad N \quad COOR_3$$

wherein $R_2$ is selected from the group consisting of lower alkanoyloxy and benzoyloxy; with a compound selected from the group consisting of a lower alkyl alcohol, phenol, lower alkanoic acid or its mercury or silver salt, sodium azide, potassium azide, ammonia, lower alkylamine, and lower dialkylamine at a temperature of from about —10°C to about 110°C in the presence of an effective catalytic amount of a catalyst selected from the group consisting of mercuric acetate, mercuric chloride, dimethoxy mercury, thallium acetate, silver tetrafluoroborate, silver acetate, and lead acetate.

2. The process of claim 1 wherein $R_1$ is selected from the group consisting of benzalimino, p-nitrobenzalimino, p-methoxybenzalimino, thienylacetamido, α-aminophenylacetamido, α-amino-1,4-cyclohexadienylacetamido, phenylacetamido, and phenoxyacetamido; and $R_5$ is selected from the group consisting of lower alkoxy, lower alkanoyloxy, phenoxy, and azido.

3. The process of claim 2 wherein $R_2$ is acetoxy and $R_5$ is selected from the group consisting of methoxy, ethoxy, propionyloxy, phenoxy, and azido.

4. The process of claim 3 wherein said catalyst is selected from the group consisting of mercuric acetate, dimethoxy mercury and silver tetrafluoroborate.

5. The process of claim 4 wherein $R_1$ is phenylacetamido; $R_4$ is methyl; $R_3$ is t-butyl; $R_5$ is azido; $R_2$ is acetoxy; the reactant is sodium azide; and the catalyst is mercuric acetate.

6. The process of claim 4 wherein $R_1$ is phenylacetamido; $R_4$ is methyl; $R_3$ is t-butyl; $R_5$ is methoxy; $R_2$ is acetoxy; the reactant is methanol; and the catalyst is mercuric acetate.

7. The process of claim 4 wherein $R_1$ is benzalimino; $R_4$ is methyl; $R_3$ is t-butyl; $R_5$ is methoxy; $R_2$ is acetoxy; the reactant is methanol; and the catalyst is mercuric acetate.

8. The process of claim 4 wherein $R_1$ is benzalimino; $R_4$ is methyl; $R_3$ is t-butyl; $R_5$ is ethoxy; $R_2$ is acetoxy, the reactant is ethanol; and the catalyst is mercuric acetate.

* * * * *

UNITED STATES PATENT AND TRADEMARK OFFICE
CERTIFICATE OF CORRECTION

PATENT NO. : 3,910,902  
DATED : Oct. 7, 1975  
INVENTOR(S) : Dolfini et al.

Page 1 of 2

It is certified that error appears in the above-identified patent and that said Letters Patent are hereby corrected as shown below:

Col. 1, the first structure should be labeled --I--.

Col. 1, the second structure should be labeled --II--.

Col. 1, line 47, "phthalimido acylamino," should read --phthalimido, acylamino, --.

Col. 1, line 50, "k$^+$" should read --K$^+$--.

Col. 1, line 51, "clevable" should read --cleavable--.

Col. 2, line 50, "axido" should read --azido--.

Col. 3, line 22, "byutilizing" should read --by utilizing--.

Col. 4, line 5, "pyro-" should read --pyo- --.

Col. 4, line 36, "Methysulfenyl" should read --Methylsulfenyl--.

Col. 5, line 40, "Ch$_3$" should read --CH$_3$--.

Col. 6, line 15, "β" should read --7β--.

Col. 6, line 59, "431 1 mg." should read --431 mg.--.

Col. 7, line 47, "o-methoxy" should read --α-methoxy--.

Col. 7, line 49, "CH$_3$Oh" should read --CH$_3$OH--.

Signed and Sealed this sixth Day of April 1976

[SEAL]

Attest:

RUTH C. MASON  
*Attesting Officer*

C. MARSHALL DANN  
*Commissioner of Patents and Trademarks*

UNITED STATES PATENT AND TRADEMARK OFFICE
CERTIFICATE OF CORRECTION

PATENT NO. : 3,910,902
DATED : 10/7/75
INVENTOR(S) : Dolfini et al.

It is certified that error appears in the above-identified patent and that said Letters Patent are hereby corrected as shown below:

Page 2 of Table I, 2nd line under "$R_3$", the structure should read
--$CH_3O$-⟨ ⟩-$CH_2$- --.

Page 2 of Table I, 7th line under "$R_5$", the structure should read
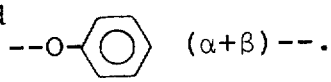
--O-⟨ ⟩ (α+β) --.

Page 2 of Table I, 13th line under "$R_1$", the structure should read
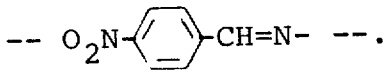
-- $O_2N$-⟨ ⟩-CH=N- --.

Col. 13, line 35, "phenoxy thienyl," should read --phenoxy, thienyl,--.

Signed and Sealed this sixth Day of April 1976

[SEAL]

Attest:

RUTH C. MASON
Attesting Officer

C. MARSHALL DANN
Commissioner of Patents and Trademarks